United States Patent
Borges et al.

(10) Patent No.: US 11,359,749 B2
(45) Date of Patent: Jun. 14, 2022

(54) CONDUIT LOCKING SYSTEM FOR AN APPLIANCE

(71) Applicant: DuraVent, Inc., Detroit, MI (US)

(72) Inventors: Luis Borges, Blainville (CA); Zhaojia Wang, Davis, CA (US)

(73) Assignee: DuraVent, Inc., Detroit, MI (US)

( * ) Notice: Subject to any disclaimer, the term of this patent is extended or adjusted under 35 U.S.C. 154(b) by 211 days.

(21) Appl. No.: 16/794,386

(22) Filed: Feb. 19, 2020

(65) Prior Publication Data
US 2020/0263815 A1 Aug. 20, 2020

Related U.S. Application Data

(60) Provisional application No. 62/807,295, filed on Feb. 19, 2019.

(51) Int. Cl.
| | |
|---|---|
| *F16L 21/08* | (2006.01) |
| *F16L 23/00* | (2006.01) |
| *F16L 23/08* | (2006.01) |

(52) U.S. Cl.
CPC ............. *F16L 23/003* (2013.01); *F16L 23/08* (2013.01)

(58) Field of Classification Search
CPC ... F16L 37/084; F16L 37/0847; F16L 37/098; F16L 37/0985; F16L 37/12; F16L 37/127; F16L 37/133; F16L 33/08; F16L 33/085; F16L 21/08; F16L 21/002; F16L 21/02; F16L 21/022; F16L 21/03; F16L 23/036; F16L 23/003; F16L 23/08
USPC ..................... 285/87, 82, 400, 403
See application file for complete search history.

(56) References Cited

U.S. PATENT DOCUMENTS

| | | | | |
|---|---|---|---|---|
| 1,384,332 | A | * | 7/1921 | Mullenux ............... B25B 27/10 285/320 |
| 3,407,448 | A | | 10/1968 | Tetzlaff et al. |
| 4,093,282 | A | | 6/1978 | Kyriakodis |
| 4,273,367 | A | | 6/1981 | Keeney et al. |
| 4,487,437 | A | * | 12/1984 | Dickirson ........... F16L 37/0985 285/319 |
| 4,695,080 | A | | 9/1987 | Oetiker |

(Continued)

FOREIGN PATENT DOCUMENTS

DE 10324236 A1 8/2004

OTHER PUBLICATIONS

English language machine-assisted translation of DE10324236A1 downloaded from Espacenet.com on Apr. 15, 2020, 9 pages.

*Primary Examiner* — Aaron M Dunwoody
(74) *Attorney, Agent, or Firm* — Howard & Howard Attorneys PLLC

(57) ABSTRACT

A conduit locking system includes a first cylindrical conduit having a male and female portion. The female portion includes an engagement protrusion that is radially disposed on an outer surface, and an inner surface that is configured to engage an outer surface of a male portion of a second cylindrical conduit to define a continuous fluid passageway. The conduit locking system comprises an annular band having a tensioner and is configured to engage the male portion of the second cylindrical conduit. The annular band may also comprise a plurality of fingers disposed radially about the annular band. The plurality of fingers may be configured to engage the engagement protrusion of the female portion of the first cylindrical conduit. The conduit locking system is manipulatable between an unclamped position to a clamped position.

19 Claims, 13 Drawing Sheets

(56) References Cited

U.S. PATENT DOCUMENTS

| | | | |
|---|---|---|---|
| 5,039,137 A | | 8/1991 | Cankovic et al. |
| 5,915,739 A | | 6/1999 | Cradduck et al. |
| 5,930,872 A | | 8/1999 | McBride et al. |
| 6,155,607 A | * | 12/2000 | Hewitt ................ F16L 37/0985 285/322 |
| 6,481,759 B1 | * | 11/2002 | Kawasaki ........... F16L 37/0985 285/319 |
| 6,511,290 B1 | | 1/2003 | Gatley, Jr. |
| 6,533,332 B2 | | 3/2003 | Vitel et al. |
| 7,802,821 B2 | | 9/2010 | Rigollet et al. |
| 7,896,400 B2 | | 3/2011 | Brill et al. |
| 7,946,001 B2 | | 5/2011 | Krauss |
| 8,060,991 B2 | | 11/2011 | Ryhman et al. |
| 8,474,878 B2 | | 7/2013 | Richter |
| 2003/0172513 A1 | * | 9/2003 | Takei ................. F16L 37/0985 29/426.4 |
| 2004/0075276 A1 | | 4/2004 | Lemke et al. |
| 2005/0249610 A1 | | 11/2005 | Fischer |
| 2016/0040809 A1 | | 2/2016 | Bertler et al. |
| 2018/0119953 A1 | | 5/2018 | Sugatani et al. |
| 2018/0142822 A1 | * | 5/2018 | Felstead ................ F16L 33/225 |
| 2021/0285684 A1 | * | 9/2021 | Beach .................... F16L 33/24 |

* cited by examiner

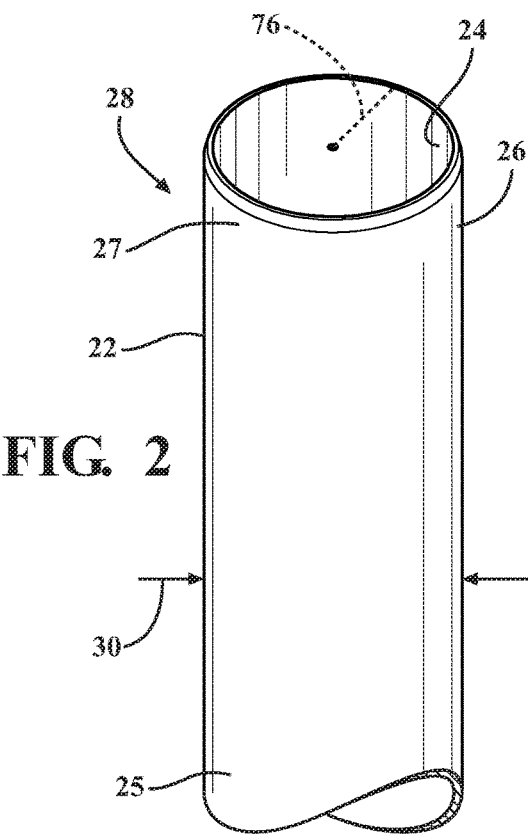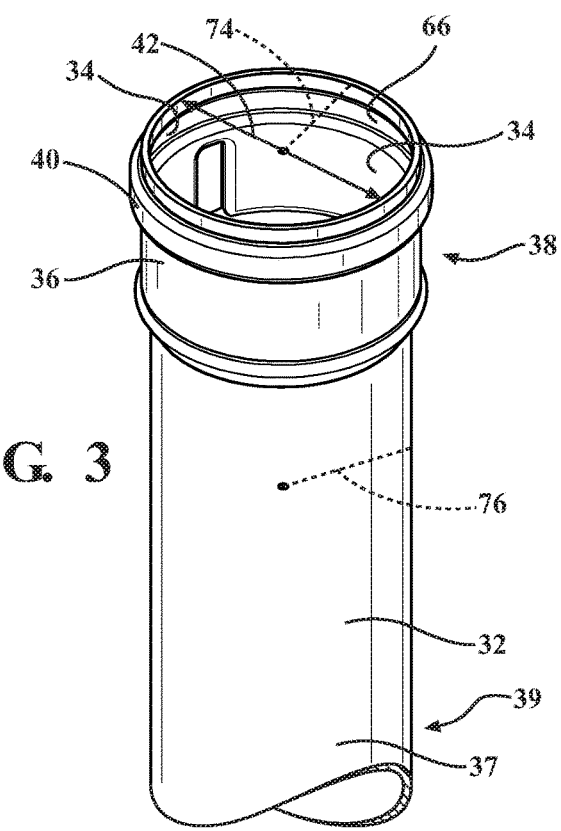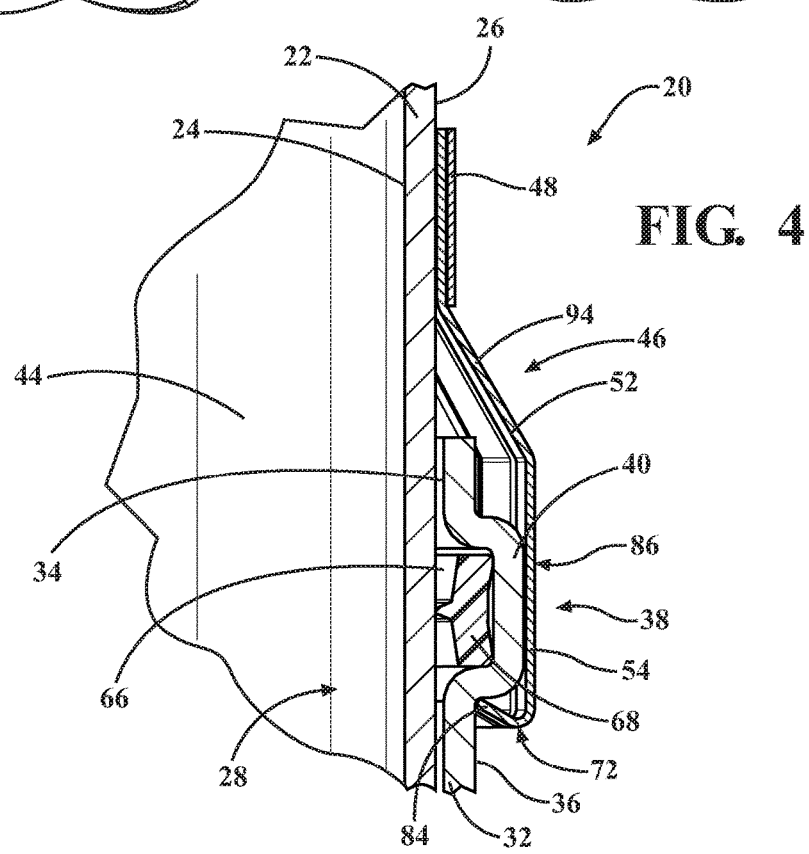

CONDUIT LOCKING SYSTEM FOR AN APPLIANCE

CROSS-REFERENCE TO RELATED APPLICATION

This application claims priority to U.S. Provisional Patent Application No. 62/807,295, filed Feb. 19, 2019, the entirety of which is hereby incorporated herein by reference.

BACKGROUND

Traditional appliance exhaust venting systems are utilized to remove exhaust gas from a home or building. In the heating and cooling industry, many sections of conduit must be joined together to route the exhaust gas from the appliance within the house or building to the roof or other exterior surface. Joining these sections of conduit together can be burdensome for an installer, and it is often difficult to safely and securely connect the sections of conduit together.

With the recent development of high efficiency appliances, there is a need to have positive pressure venting systems safely and efficiently vent exhaust gas. Some of the connections currently used in exhaust venting systems are difficult to manipulate to make secure connections. Additionally, a significant amount of conduit may be wasted because of the requirement that specific male and female connectors be used with one another in current exhaust venting systems. As such, there is a need for an efficient, safe, and easily manipulated conduit locking system.

SUMMARY

The present disclosure relates generally to a conduit locking system for appliance exhaust. One exemplary configuration of the conduit locking system for appliance exhaust includes a first cylindrical conduit having an inner surface and an outer surface. The first cylindrical conduit includes a male portion having an outer diameter. The conduit locking system also includes a second cylindrical conduit having an inner surface and an outer surface. The second cylindrical conduit also has a female portion including an engagement protrusion radially disposed on the outer surface. The female portion has an inner diameter configured to engage the outer diameter of the male portion of the first cylindrical conduit to define a continuous fluid passageway therethrough. The conduit locking system further includes a conduit locking band. The conduit locking band includes an annular band having a tensioner configured to engage the male portion of the first cylindrical conduit. The conduit locking band also includes a locking arrangement coupled to the annular band and comprises a plurality of fingers that are disposed radially about the annular band. The plurality of fingers are configured to engage the engagement protrusion of the female portion of the second cylindrical conduit. The conduit locking band is moveable from a clamped position to an unclamped position. The clamped position has a circumference less than the circumference of the unclamped position.

One exemplary method for securing a first cylindrical conduit to a second cylindrical conduit includes the step of providing a first cylindrical conduit having a male portion having an outer diameter. The method also includes the step of providing a second cylindrical conduit having a female portion including an engagement protrusion extending radially outward and having an inner diameter. The inner diameter of the female portion of the second cylindrical conduit is greater than the outer diameter of the male portion of the first cylindrical conduit. The engagement protrusion defines a circumferential channel on an inner surface of the female portion of the second cylindrical conduit. The method additionally comprises the step of providing a conduit locking band comprising an annular band having a tensioner and a locking arrangement. The locking arrangement is coupled to the annular band and includes a plurality of fingers. The plurality of fingers are configured to engage the female portion of the second cylindrical conduit. The method further includes the step of engaging the plurality of fingers with the engagement protrusion on the outer surface of the female portion of the second cylindrical conduit to the conduit locking band. The method also comprises the step of engaging the male and female portions of the first and second cylindrical conduits through the conduit locking band such that the plurality of fingers remain engaged with the engagement protrusion on the female portion and such that the conduit locking band is disposed in an unclamped position about the outer diameter of the male portion of the first cylindrical conduit, whereby the male and female portions engage to define a continuous fluid passageway and the conduit locking band is positioned for clamping. The method additionally includes the step of applying a force to move the conduit locking band from the unclamped position to a clamped position thereby releasably locking the first cylindrical conduit to the second cylindrical conduit.

These and other configurations, features, and advantages of the present disclosure will be apparent to those skilled in the art. The present disclosure is not to be limited to or by these configurations, features, and advantages.

BRIEF DESCRIPTION OF THE DRAWINGS

Advantages of the present disclosure will be readily appreciated as the same becomes better understood by reference to the following detailed description when considered in connection with the accompanying drawings.

FIG. 2 is a perspective view of the first cylindrical conduit including a male portion.

FIG. 3 is a perspective view of the second cylindrical conduit including a female portion.

FIG. 4 is cross-sectional view of the conduit locking system taken along line 4-4 of FIG. 1.

DETAILED DESCRIPTION

As the heating and cooling industry strives to make appliances more energy efficient, new appliances require a positive pressure venting system. Positive pressure venting systems require robust venting systems utilizing a conduit coupling system that securely and safely joins two pieces of conduit together. Additionally, a conduit coupling system that can releasably couple and uncouple sections of conduit to one another makes installation of venting systems easier.

One example of a conduit coupling system for defining an appliance exhaust that may be utilized to secure and safely join adjacent sections of conduit may comprise a conduit locking system. Generally, two or more sections of conduit may be joined together to vent exhaust from the source at an appliance to the exterior of a home or building.

Figure 1:
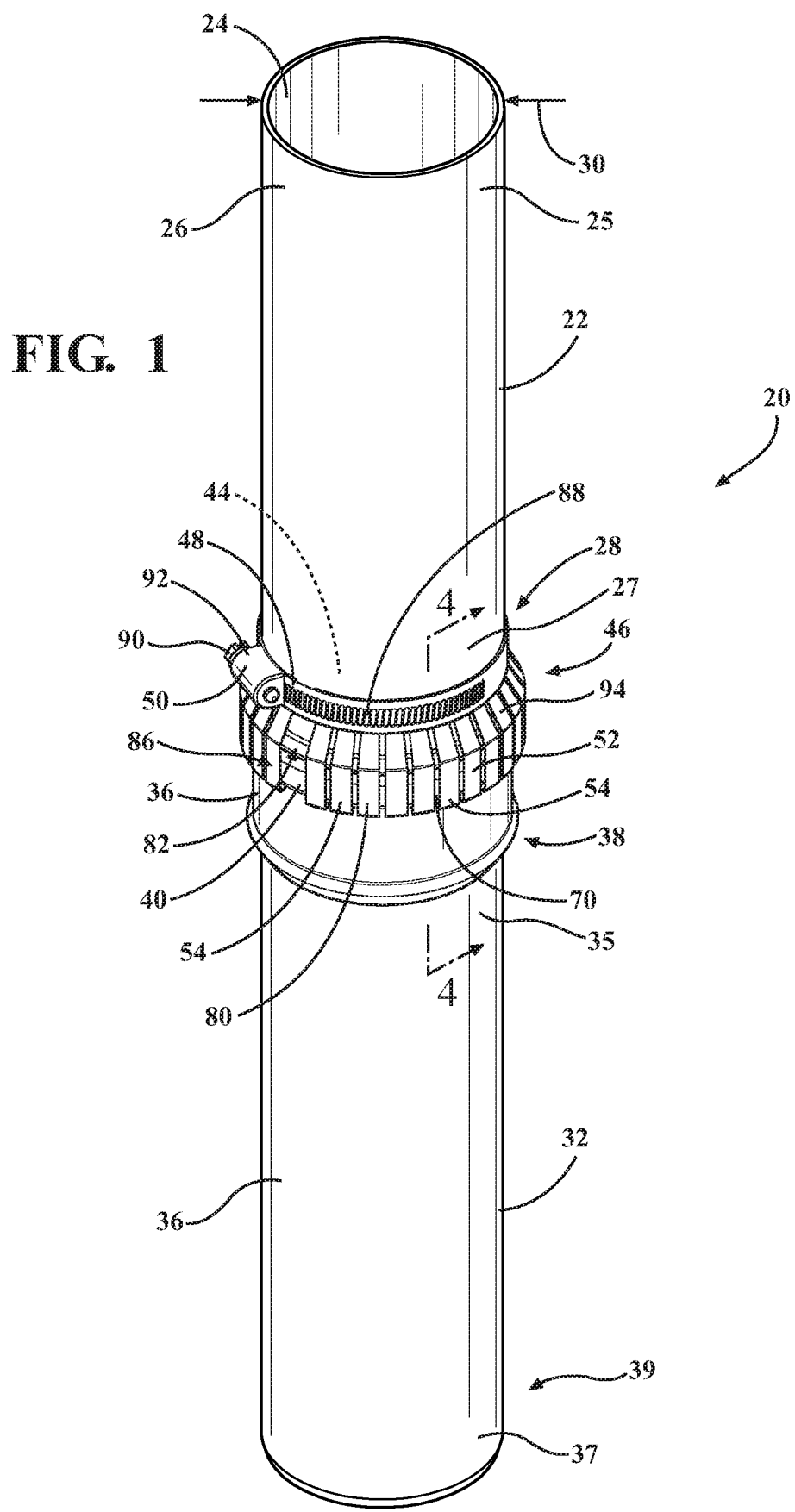
FIG. 1 is a perspective view of a conduit locking system including a first cylindrical conduit, a second cylindrical conduit, and a conduit locking band.

FIG. 1 illustrates a conduit locking system 20 for coupling a first cylindrical conduit 22 to a second cylindrical conduit 32 to route exhaust from an appliance to an exterior environment. The first cylindrical conduit 22 having an inner surface 24 and an outer surface 26. The first cylindrical conduit 22 may also comprise a first end 27 and an opposing second end 25. The first end 27 may comprise a male portion 28 having an outer diameter 30.

The conduit locking system 20 further comprises a second cylindrical conduit 32 having an inner surface 34 and an outer surface 36. The second cylindrical conduit 32 may also comprise a first end 37 and an opposing second end 35. The second end 35 may comprise a female portion 38 having an engagement protrusion 40 radially disposed on the outer surface 36. The female portion 38 may comprise an inner diameter 42 configured to engage the outer diameter 30 of the male portion 28 of the first cylindrical conduit 22 to define a continuous fluid passageway 44. The continuous fluid passageway 44 allows fluid, such as an exhaust gas, to flow between the first cylindrical conduit 22 and the second cylindrical conduit 32 or vice versa.

While not illustrated in the Figures, it is contemplated that the first cylindrical conduit 22 may comprise a female portion 38 disposed at the second end 25 to allow for coupling of an additional cylindrical conduit to the first cylindrical conduit 22 opposite the second cylindrical conduit 32. Furthermore, it is also contemplated that the first end 37 of the second cylindrical conduit 32 may comprise a male portion 39 to allow for coupling of an additional cylindrical conduit to the second cylindrical conduit 32 opposite the first cylindrical conduit 22. This allows for a chain of cylindrical conduits 22, 32 to be coupled to create a continuous pathway of any length.

The conduit locking system 20 also comprises a conduit locking band 46. The conduit locking band 46 comprises an annular band 48 having a tensioner 50 configured to engage the male portion 28 of the first cylindrical conduit 22. The annular band 48 may also comprise a locking arrangement 52 coupled to the annular band 48 and comprising a plurality of fingers 54 extending from and disposed radially about the annular band 48. The plurality of fingers 54 may be configured to engage the engagement protrusion 40 of the female portion 38 of the second cylindrical conduit 32.

The conduit locking band 46 is moveable between an unclamped position 56 to a clamped position 58 and vice versa. The conduit locking system 20 may be configured such that the conduit locking band 46, and by extension the annular band 48, may have an unclamped circumference 60 when in the unclamped position 56 that is greater than the clamped circumference 62 when in the clamped position 58.

Referring to FIG. 2, an exemplary configuration of the male portion 28 of the first cylindrical conduit 22 is illustrated. The first cylindrical conduit 22 has an inner surface 24 and an outer surface 26. The outer surface 26 may be configured to engage the inner surface 34 of the female portion 38 of the second cylindrical conduit 32 to define the continuous fluid passageway 44.

Referring to FIG. 3, an exemplary configuration of the female portion 38 of the second cylindrical conduit 32 is illustrated. The second cylindrical conduit 32 may have an inner surface 34 having an inner diameter 42. The inner diameter 42 of the female portion 38 of the second cylindrical conduit 32 is greater than the outer diameter 30 of the male portion 28 of the first cylindrical conduit 22 allowing the first and second cylindrical conduits 22, 32 to be joined together to define the continuous fluid passageway 44.

The engagement protrusion 40 of the female portion 38 of the second cylindrical conduit 32 may extend in a radial direction about the outer surface 36 of the second cylindrical conduit 32. The engagement protrusion 40 may also at least partially define a circumferential channel 66 on the inner surface 34 of the female portion 38 of the second cylindrical conduit 32. The inner surface 34 of the circumferential channel 66 may be configured to partially receive a seal 68. The seal 68 may comprise an annularly shaped ring configured to be housed in the circumferential channel 66. The seal 68 may engage and deflect against the outer surface 26 of the male portion 28 of the first cylindrical conduit 22 creating an air tight seal that defines the continuous fluid passageway 44 when the male portion 28 is disposed within the female portion 38. The seal 68 may comprise an elastomer. In one configuration, the elastomer may comprise ethylene propylene diene monomer rubber (EPDM rubber). In another configuration, the seal 68 may comprise silicone. It should be appreciated that any material may be used for the seal 68 that has properties to form an air tight seal between the first and second conduits 22, 32.

The seal 68 may be configured to form the air tight seal between the first and second conduits 22, 32. In such configurations when the seal 68 is an air-tight seal, the seal 68 is typically used for the conduit locking system 20 to facilitate the use of a positive pressure ventilation system. A positive pressure ventilation system may be fully sealed to prevent spillage of flue or venting products into an occupied portion of the house or building. Furthermore, positive pressure ventilation systems may produce condensate if the flue products cool below their dew points. Positive pressure ventilation systems may become more prevalent as appliance manufacturers are making appliances more energy efficient.

FIG. 4 illustrates a sectional view of the conduit locking system 20. As described above, the male portion 28 of the first cylindrical conduit 22 may be disposed in the female portion 38 of the second cylindrical conduit 32 when coupling the first and second cylindrical conduits 22, 32. The seal 68 may engage the outer surface 26 of male portion 28 of the first cylindrical conduit 22 creating the continuous fluid passageway 44. The plurality of fingers 54 engage and grip the engagement protrusion 40 to secure first and second cylindrical conduits 22, 32 together.

Multiple configurations of the engagement protrusion 40A, 40B, 40C, 40D, 40E are illustrated in FIGS. 11A-11E. In one configuration, the engagement protrusion 40A defines a cross-sectional profile rectangular in shape. In another configuration, the engagement protrusion 40B defines a cross-sectional profile triangular in shape. In yet another configuration, the engagement protrusion 40C defines a cross-sectional profile trapezoidal in shape. In a different configuration, the engagement protrusion 40D defines a cross-sectional profile ovular in shape. In a further configuration, the engagement protrusion 40E defines a cross-sectional profile circular in shape. The shape of the engagement protrusion 40 may be configured to assist the plurality of fingers 54 in engaging and/or gripping the engagement protrusion 40 to secure first and second cylindrical conduits 22, 32 to one another.

The first and second cylindrical conduits 22, 32 may comprise a polyolefin selected from the group consisting of polyethylene, polymethylpentene, polyethylene terephthalate, and combinations thereof. It should also be appreciated that any suitable material to form conduits and have properties to route venting exhaust from the appliance to the exterior of a home or building are considered. For example, metal conduit or poly vinyl chloride (PVC) conduit.

The engagement protrusion 40 extends in a radial direction from the outer surface 36 of the second cylindrical conduit 32. In one exemplary configuration, the engagement protrusion 40 may be configured to extend from about 1 mm to about 10 mm. Alternatively, the engagement protrusion 40 may be configured to extend from about 1 mm to about 8 mm. In yet another configuration, the engagement protrusion 40 may be configured to extend from about 1 mm to about 5 mm from the outer surface 36 of the second cylindrical conduit 32. The distance that the engagement protrusion 40 extends from the outer surface 36 of the second cylindrical conduit 32 may be determined based on the diameter/circumference of the second cylindrical conduit 32 such that the engagement protrusion 40 extends far enough to allow the plurality of fingers 54 of the locking arrangement 52 to engage and secure the engagement protrusion 40 to the female portion 38.

The outer surface 36 of the engagement protrusion 40 of the female portion 38 of the second cylindrical conduit 32 may define a protrusion radius 74. The outer surface 36 of the female portion 38 of the second cylindrical conduit 32 may define a conduit radius 76. The protrusion radius 74 and the conduit radius 76 may have a ratio from about 1:1.1 to about 1:1.25.

Figure 5A:
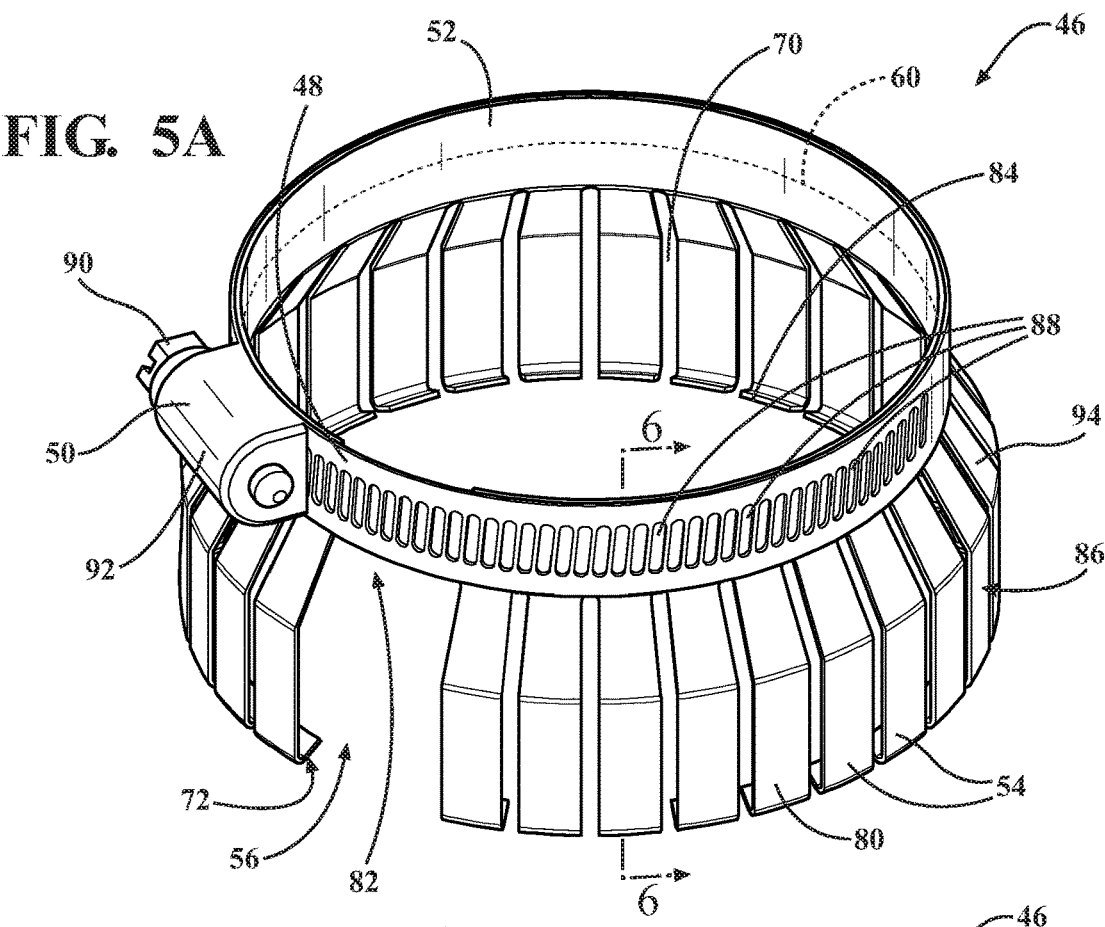
FIG. 5A is a perspective view of the conduit locking band in an unclamped position, with the conduit locking band including an annular band and a locking arrangement.
Figure 5B:
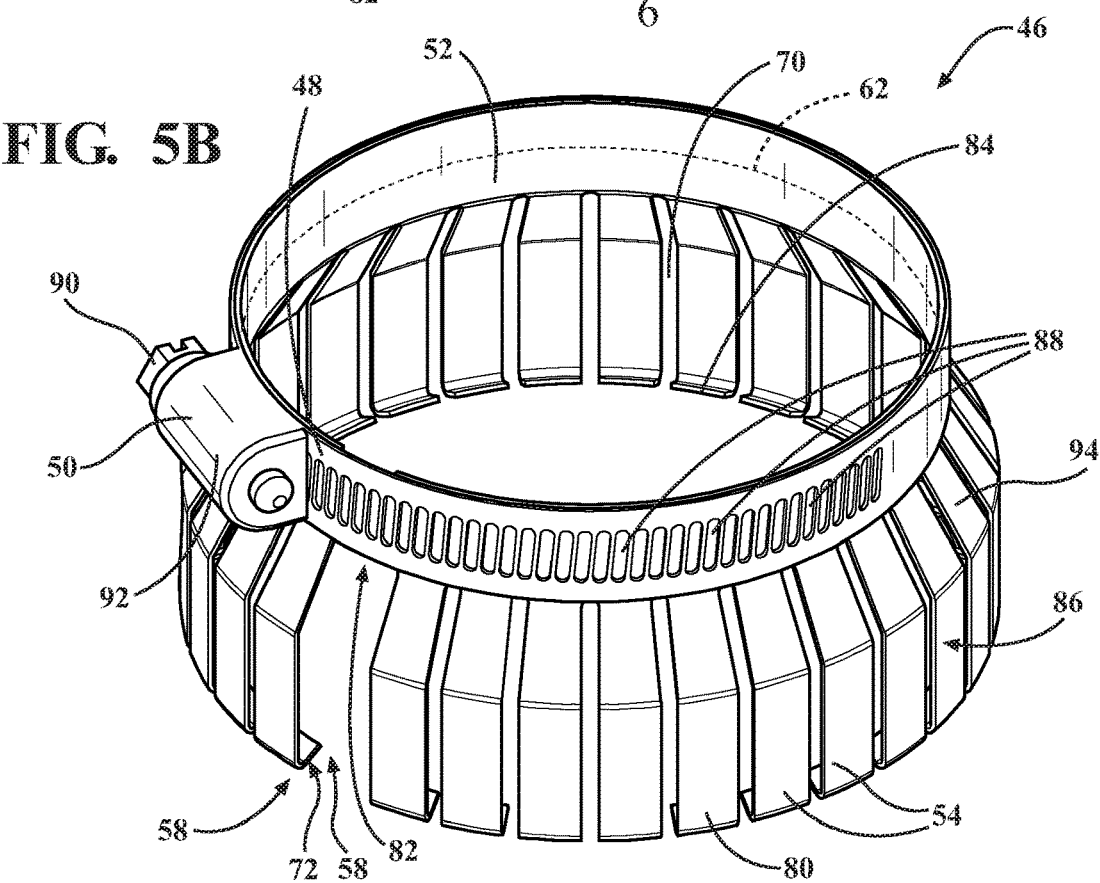
FIG. 5B is a perspective view of the conduit locking band in a clamped position.

FIG. 5A illustrates the conduit locking band 46 in an unclamped position 56 having an unclamped circumference 60. FIG. 5B illustrates the conduit locking band 46 in a clamped position 58 having a clamped circumference 62. The conduit locking band 46 may comprise the annular band 48 and the locking arrangement 52. The annular band 48 has a tensioner 50 configured to move the conduit locking band 46 from the unclamped position 56 to the clamped position 58. Additionally, the tensioner 50 may move the conduit locking band 46 from the clamped position 58 to the unclamped position 56.

In one configuration, the tensioner 50 may comprise a hose clamp having a screw 90 in a housing 92 configured to engage slots 88 on the annular band 48. As a rotational force is applied to the screw 90, the circumference of the annular band 48 decreases causing the conduit locking band 46 to clamp to the outer surface 26 of the male portion 28 of the first cylindrical conduit 22. It should be appreciated that other tensioners 50 are known in the art and may alternatively take other forms to move the annular band 48 from the unclamped position 56 to the clamped position 58.

In one configuration, the locking arrangement 52 includes an annular band 48 comprising the plurality of fingers 54. The plurality of fingers 54 may have a width of about 2 mm to about 20 mm, about 3 mm to about 17 mm, or about 4 mm to about 15 mm. The locking arrangement 52 may also have a non-fingered region 70 between them. The width of the non-fingered region 70 may be about 0.1 mm to about 4 mm, about 1 mm to about 3 mm, or about 1.5 mm to about 2.5 mm. In one configuration, a single finger 80 may have the width of about 8 mm and the non-fingered region 70 may have a width of about 2 mm. The locking arrangement 52 may also have a tension gap 82 allowing the locking arrangement 52 to have a decreasing circumference and preventing the plurality of fingers 54 from overlapping. The locking arrangement 52 may have a ratio of fingered regions to non-fingered regions 70 of 8:1, or 6:1, or 4:1 along the circumference of the locking arrangement 52.

The locking arrangement 52 may also have a thickness to allow the plurality of fingers 54 to have a strength to securely engage the engagement protrusion 40 while also allowing the plurality of fingers 54 to bend enough to be placed over the engagement protrusion 40. The thickness of the locking arrangement 52 may have a thickness of about 0.2 mm to about 1.5 mm, about 0.3 mm to about 0.9 mm, or about 0.4 mm to about 0.8 mm.

Figure 6:
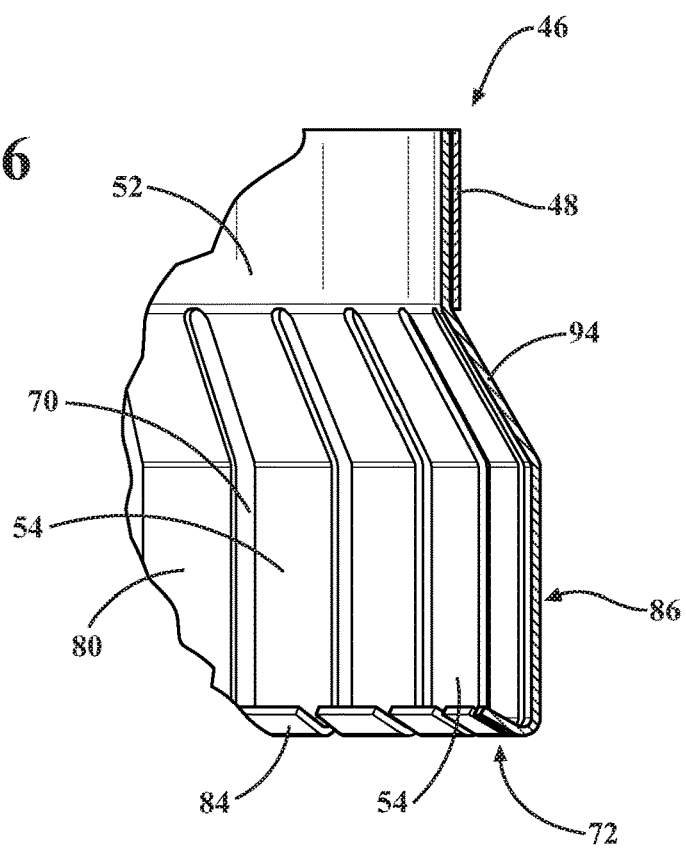
FIG. 6 is a sectional view of the conduit locking band taken along line 6-6 of FIG. 5A.

FIG. 6 illustrates a cross-sectional view of the conduit locking band 46. The conduit locking band 46 comprises the annular band 48 coupled to the locking arrangement 52. The annular band 48 and the locking arrangement 52 may be integral. The annular band 48 and the locking arrangement 52 may be integrally connected by spot welding in a plurality of locations. The spot welding allows for the annular band 48 and the locking arrangement 52 to have a decreasing circumference while remaining coupled together.

FIG. 6 also illustrates the shape of the conduit locking band 46. The annular band 48 and locking arrangement 52 may couple together having a general vertical orientation. Continuing downward, the locking arrangement 52 has a bend 94 in the outward radial direction allowing the conduit locking band 46 to fit over the engagement protrusion 40. The locking arrangement 52 continues to a downward portion 86 in the general vertical direction. Further down, the locking arrangement has a bend 94 in the inward radial direction. The bend 94 in the inward radial direction forms a hook-like portion 72 of the plurality of fingers 54 of the locking arrangement 52 of the conduit locking band 46.

Figure 7:
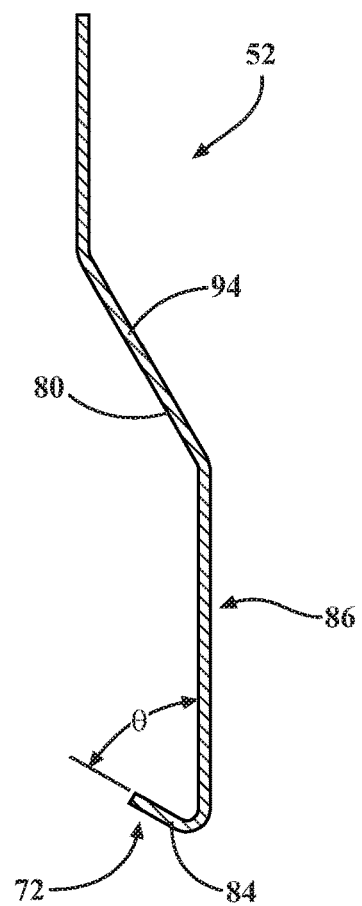
FIG. 7 is a sectional view of one of the locking arrangements including a plurality of fingers.

The plurality of fingers 54 may have the hook-like portion 72 located distal to the annular band 48. The hook-like portion 72 of the plurality of fingers 54 may be configured to engage the outer surface 36 of the engagement protrusion 40 of the female portion 38 of second cylindrical conduit 32. The hook-like portion 72 may be configured to secure the conduit locking band 46 to the engagement protrusion 40 and releasably couple the first and second conduits 22, 32 together. The hook-like portion 72 may also be described as claws 84 to engage and grip the engagement protrusion 40. As shown in FIG. 7, there is an angle θ between the hook-like portion 72 and the downward portion 86. The angle θ may be between about 0 degrees and 180 degrees, or about 20 degrees to about 160 degrees, or about 40 degrees to about 140 degrees. In one configuration, the angle θ may be about 60 degrees.

Figure 8A:
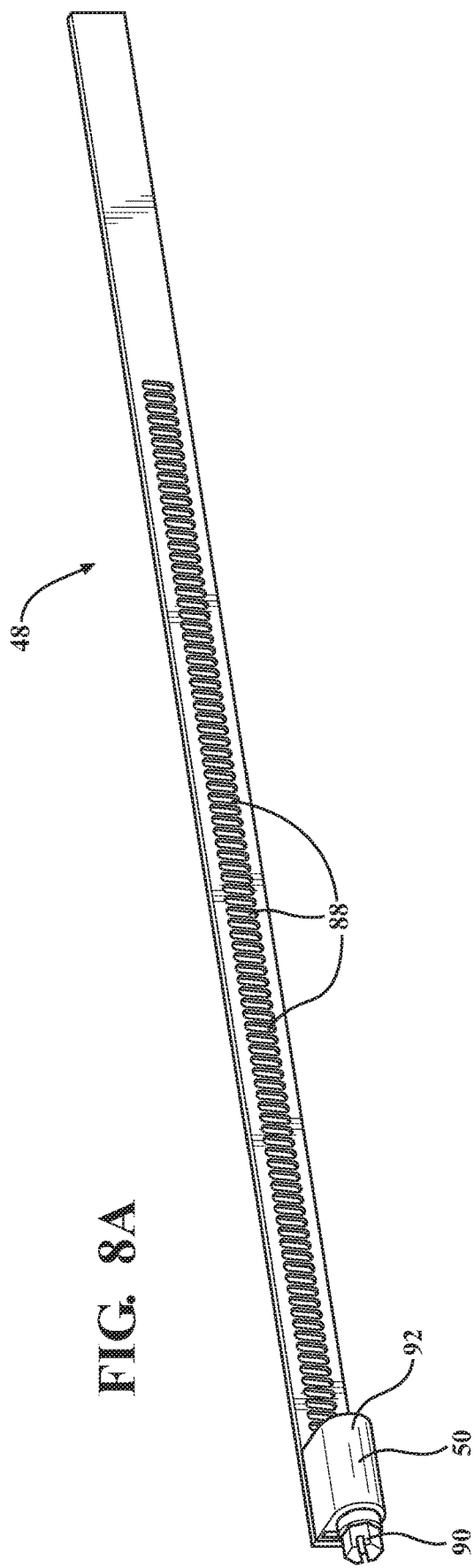
FIG. 8A is a perspective view of the annular band being pre-formed.

FIG. 8A illustrates the annular band 48 configured in a preformed state comprising the tensioner 50 having the screw 90 in the housing 92 and a plurality of slots 88 configured to cooperate with the screw 90. In one configuration, the annular band 48 is stamped from a piece of sheet metal and configured to have the slots 88 cut out and have the screw 90 and housing 92 coupled to the annular band 48.

Figure 8B:
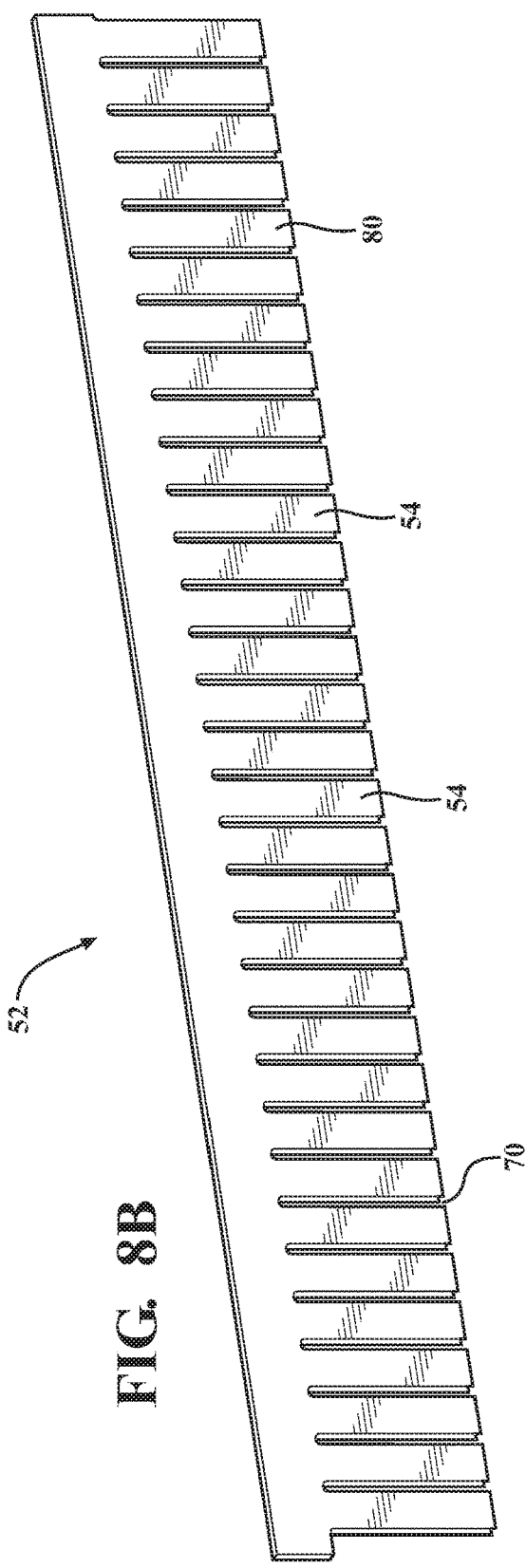
FIG. 8B is a perspective view of the locking arrangement being pre-formed.

FIG. 8B illustrates the locking arrangement 52 configured in a preformed state comprising a plurality of fingers 54, a plurality of non-fingered regions 70, and the tension gap 82. In a configuration, the locking arrangement is stamped from a piece of sheet metal and the plurality of non-fingered regions 70 are cut out.

Figure 8C:
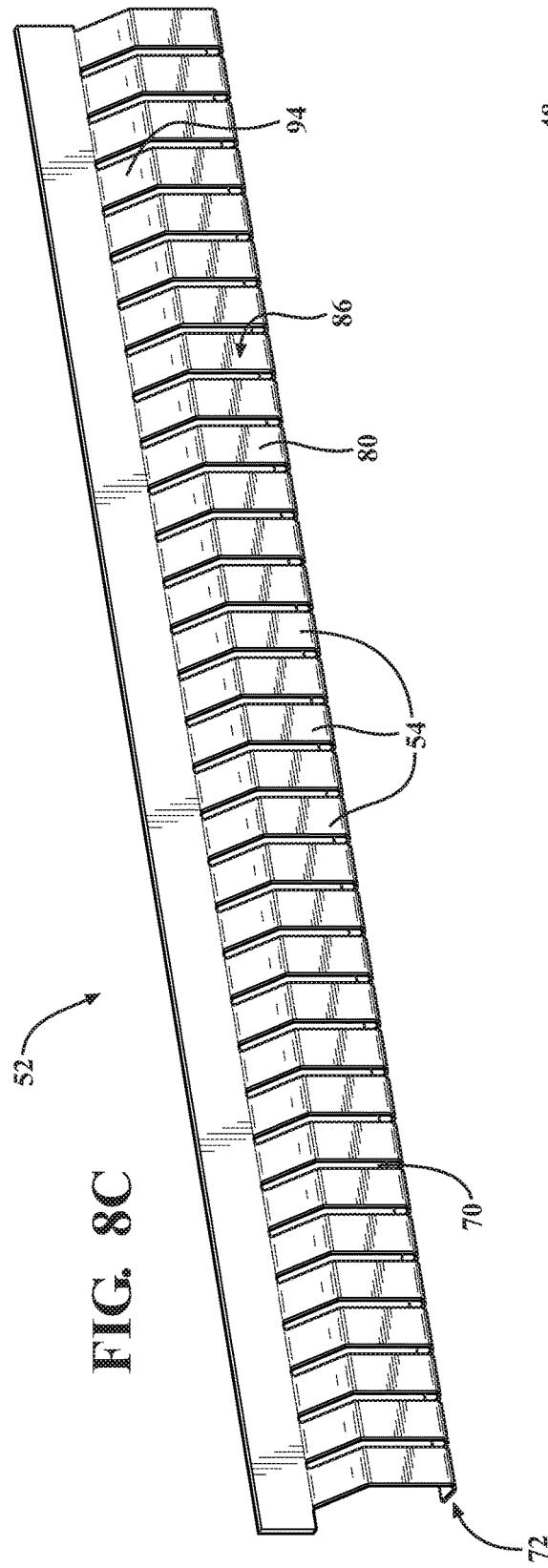
FIG. 8C is a perspective view of the locking arrangement being formed.
Figure 9:
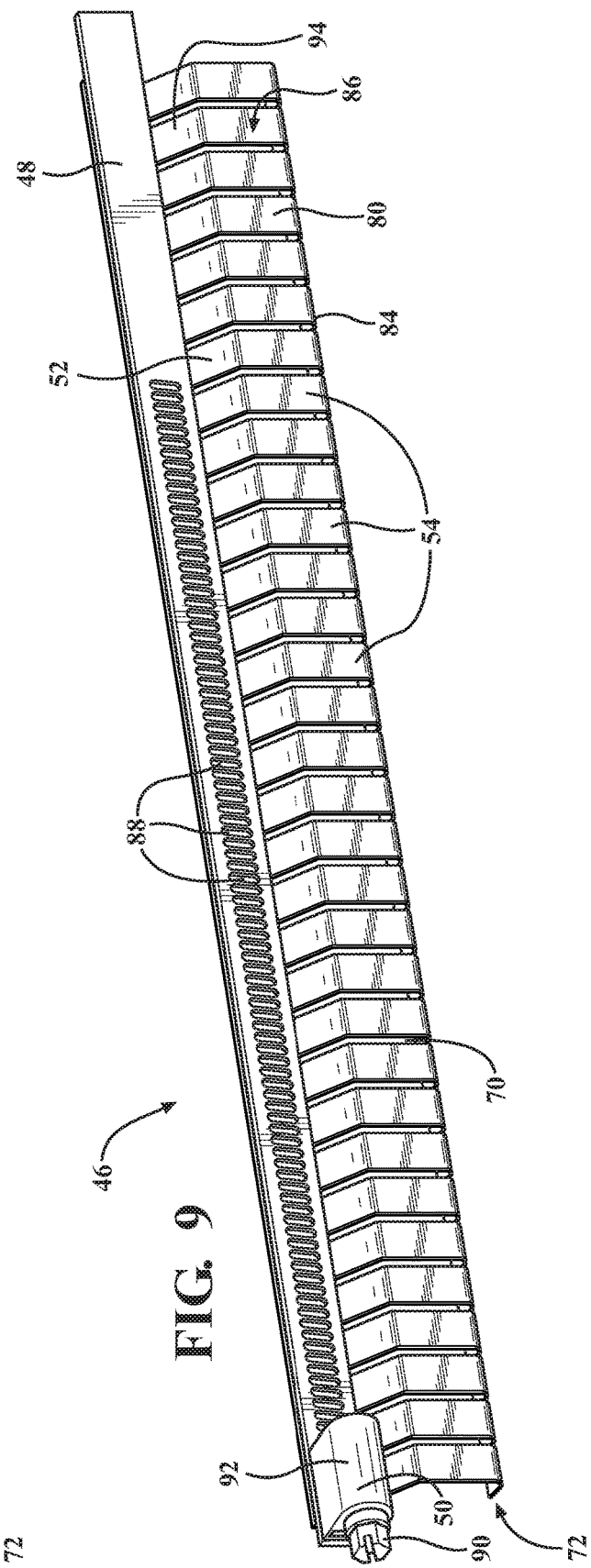
FIG. 9 is a perspective view of a formed conduit locking band.

FIG. 8C illustrates the locking arrangement 52 with the bend 94 in the radially outward direction and the bend 94 in the radially inward direction forming the hook-like portion 72 of the plurality of fingers 54. FIG. 9 illustrates the annular band 48 and the locking arrangement 52 coupled together.

The conduit locking band 46 may comprise a metal selected from the group consisting of iron, galvanized steel, aluminum, stainless steel, and combinations thereof. In one configuration, the conduit locking band 46 comprises 430 grade stainless steel. It should also be appreciated that any material having the properties to secure two pieces of conduit together are considered, such as a thermoplastic.

Figure 10A:
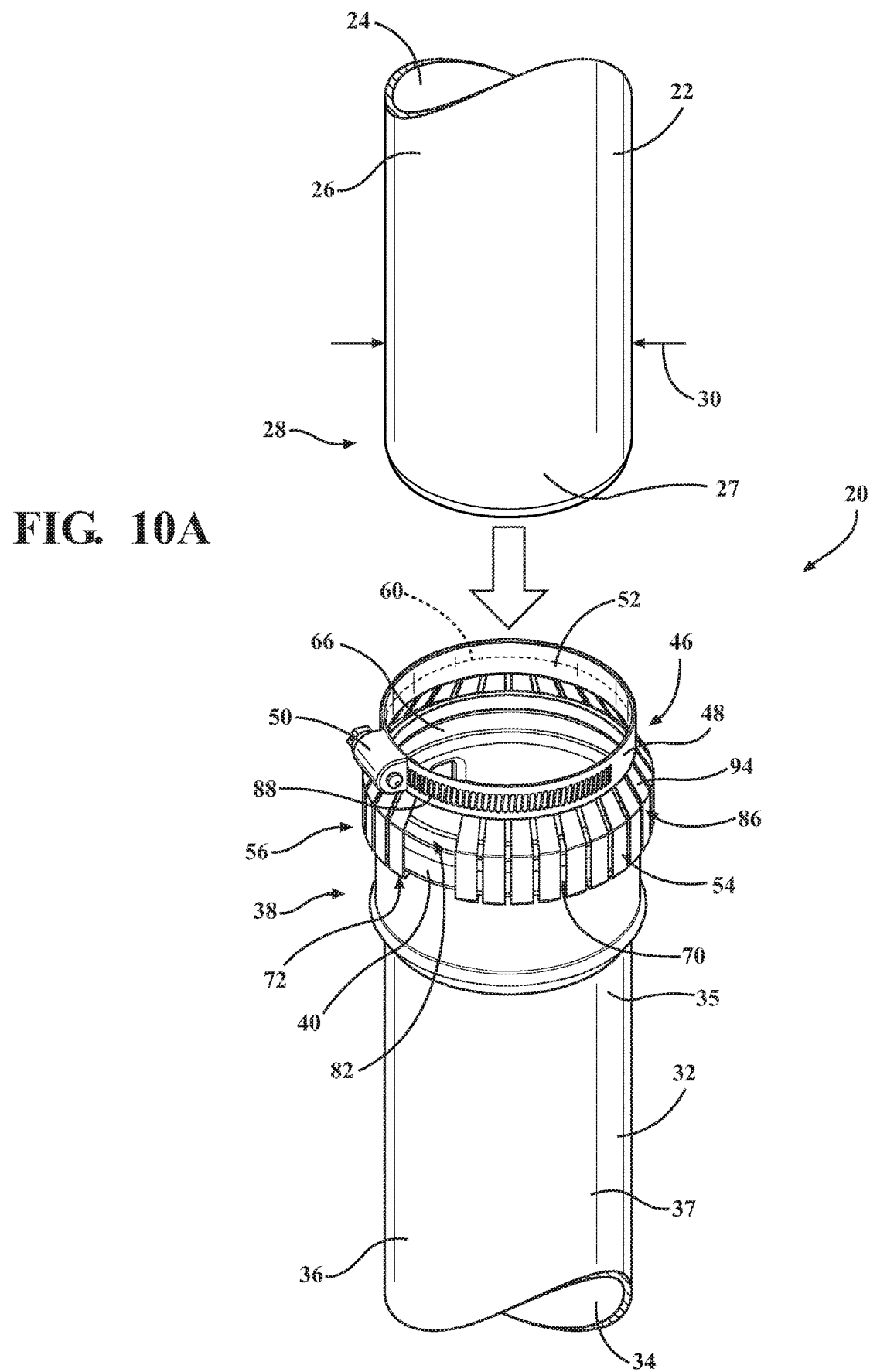
FIG. 10A is a perspective view of the male portion of the first cylindrical conduit, the female portion of the second cylindrical conduit, and the conduit locking band.

In FIG. 10A, a method of securing a first cylindrical conduit 22 to a second cylindrical conduit 32 comprising the steps of providing a first cylindrical conduit 22 having a male portion 28 having an outer diameter 30 is shown. The method includes the step of providing a second cylindrical conduit 32 having a female portion 38 including an engagement protrusion 40 extending radially outward and having an inner diameter 42. The inner diameter 42 of the female portion 38 greater than the outer diameter 30 of the male portion 28 of the first cylindrical conduit 22 and the engagement protrusion 40 defines a circumferential channel 66 on an inner surface 34 of the female portion 38 of the second cylindrical conduit 32. The method also includes the step of providing a seal 68 partially housed in the circumferential channel 66.

Figure 10B:
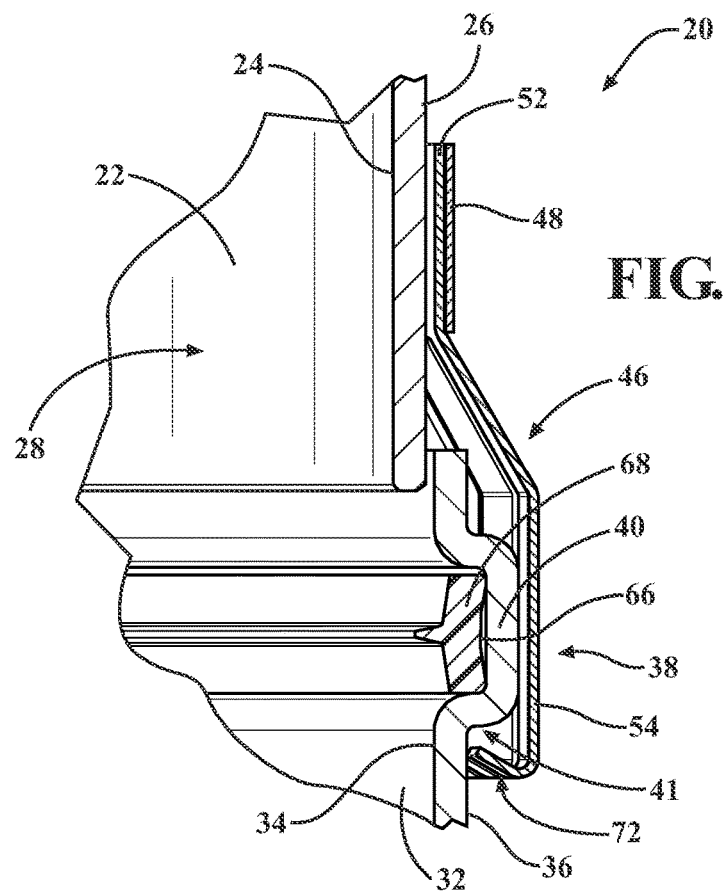
FIG. 10B is a cross-sectional view of the male portion of the first cylindrical conduit engaging the conduit locking band and the female portion of the second cylindrical conduit.

The method further includes the step of providing a conduit locking band 46 comprising an annular band 48 having a tensioner 50 and a locking arrangement 52 coupled to the annular band 48 and comprising a plurality of fingers 54 disposed radially thereabout. The plurality of fingers 54 is configured to engage the female portion 38 of the second cylindrical conduit 32. As is illustrated in FIGS. 10A and 10B, the engagement protrusion 40 on the female portion 38 of the second cylindrical conduit 32 defines a recess 41. The method includes the step of engaging the plurality of fingers 54 with the engagement protrusion 40 on the outer surface 36 of the female portion 38 of the second cylindrical conduit 32 to the conduit locking band 46. When engaged, the hook-like portion 72 of each of the plurality of fingers 54 is received by the recess 41 defined by the engagement protrusion 40.

Figure 10C:
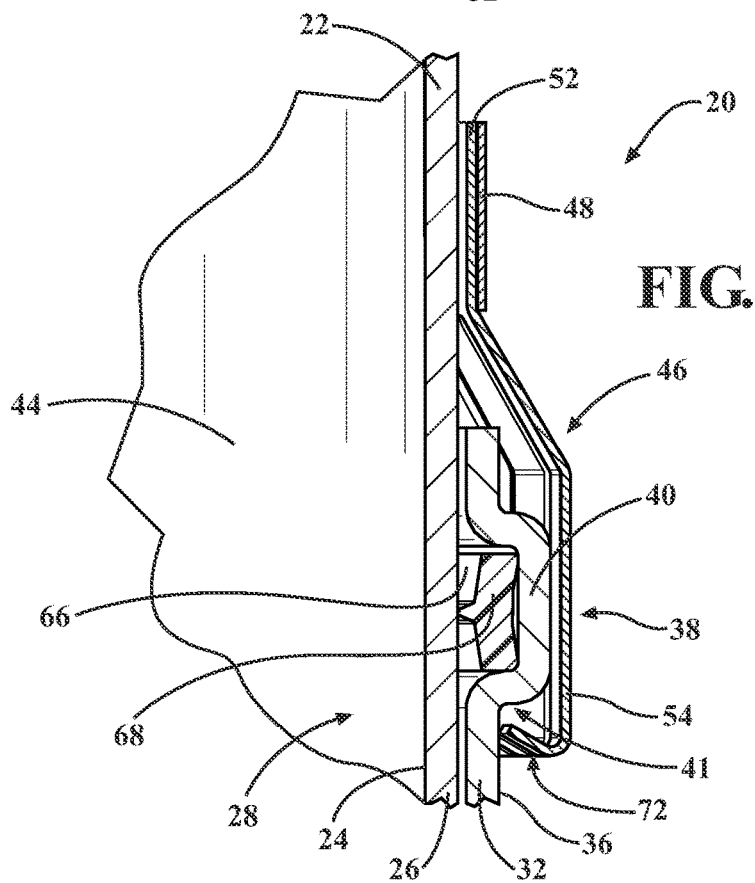
FIG. 10C is a cross-sectional view of the male portion of the first cylindrical conduit engaging the female portion of the second cylindrical conduit and the conduit locking band.

As illustrated in FIGS. 10B and 10C, the method also includes the step of engaging the male and female portions 28, 38 of the first and second cylindrical conduits 22, 32 through the conduit locking band 46, such that the plurality of fingers 54 remain engaged with the engagement protrusion 40 on the female portion 38. The conduit locking band 46 is disposed in an unclamped position 56 about the outer diameter 30 of the male portion 28 of the first cylindrical conduit 22, whereby the male and female portions 28, 38 engage to define a continuous fluid passageway 44 and the conduit locking band 46 is positioned for clamping.

Figure 10D:
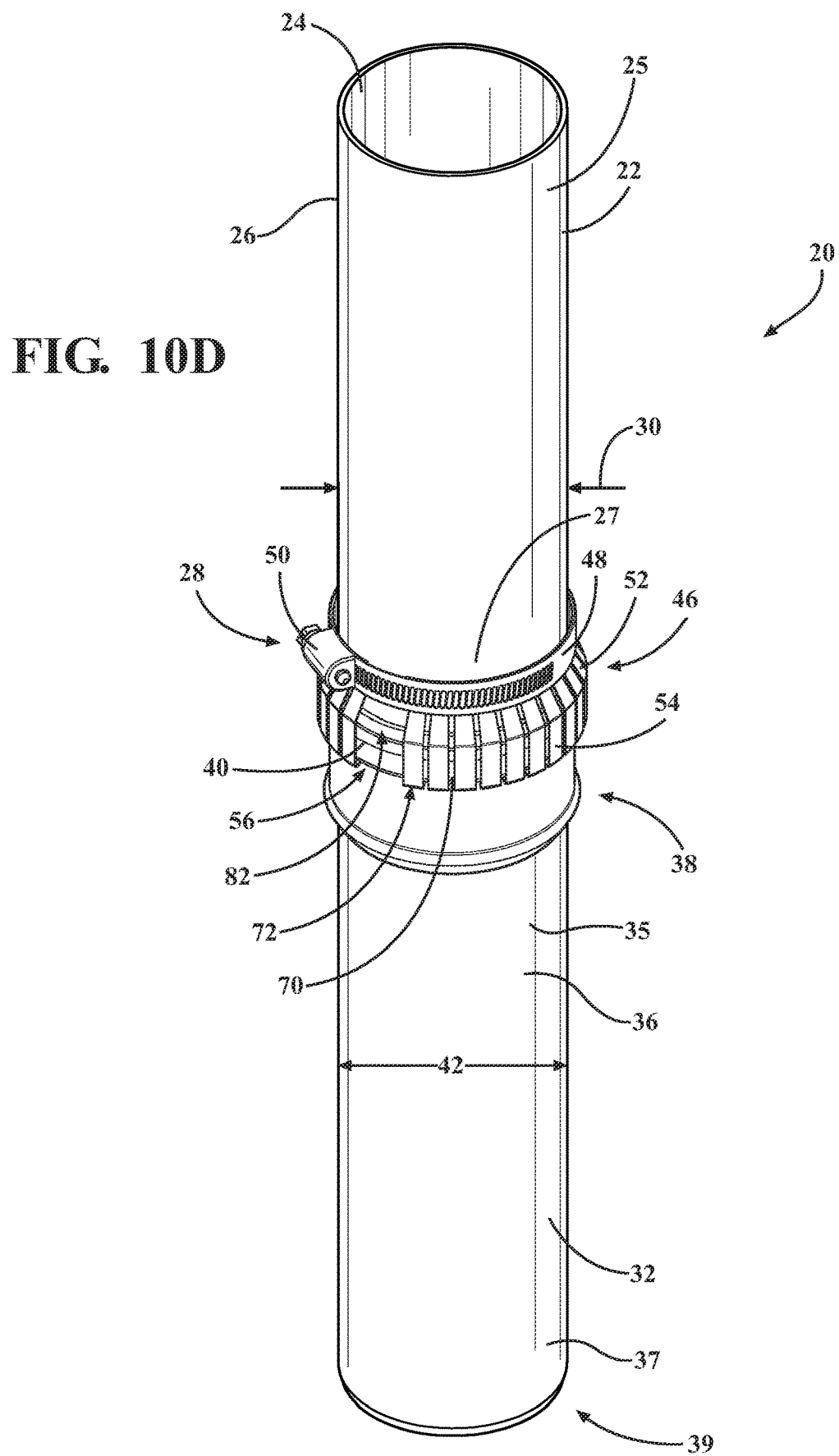
FIG. 10D is a perspective view of the conduit locking system with the conduit locking band in the unclamped position.
Figure 10E:
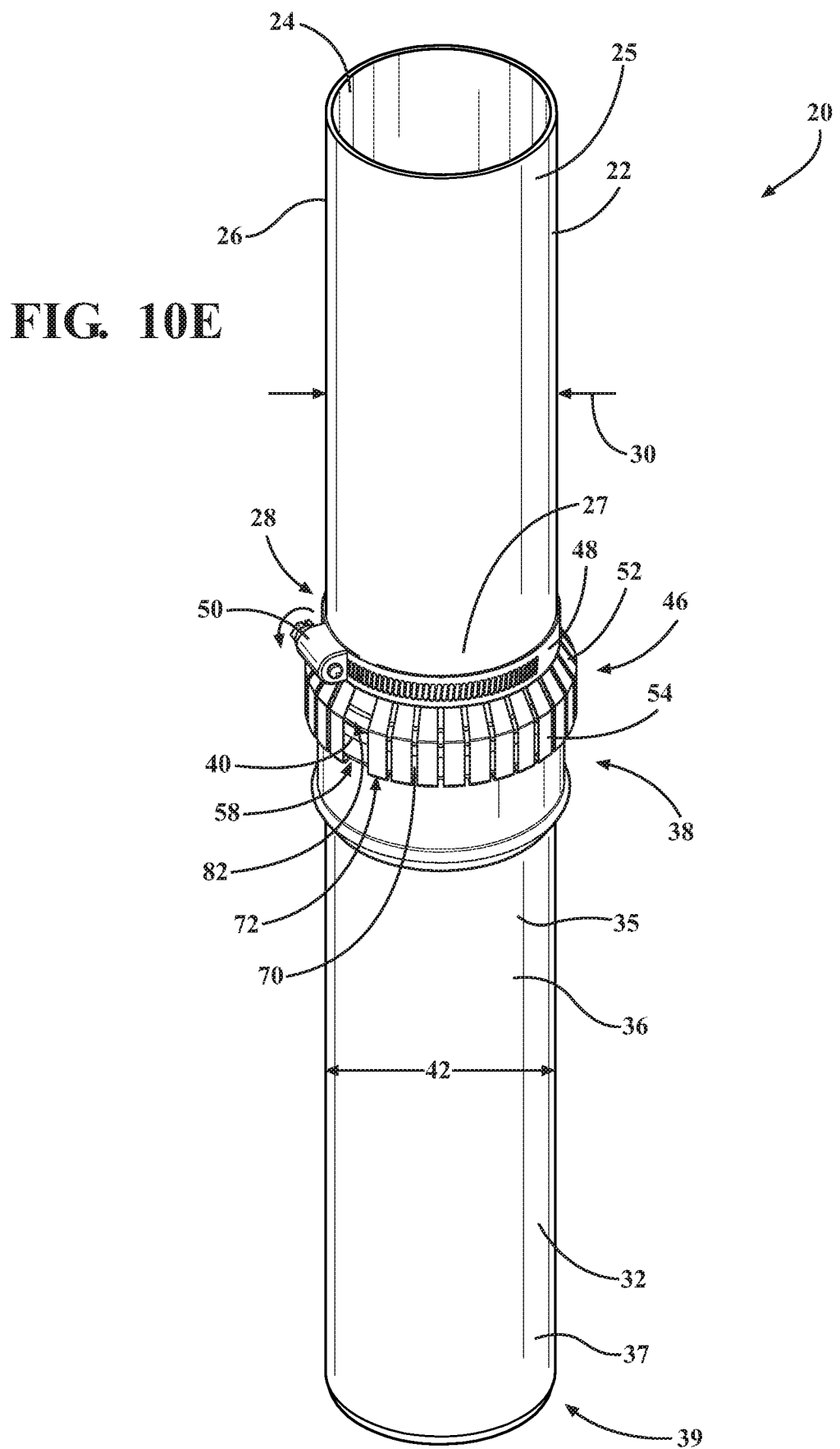
FIG. 10E is a perspective view of the conduit locking system with the conduit locking band in the clamped position.
Figure 10F:
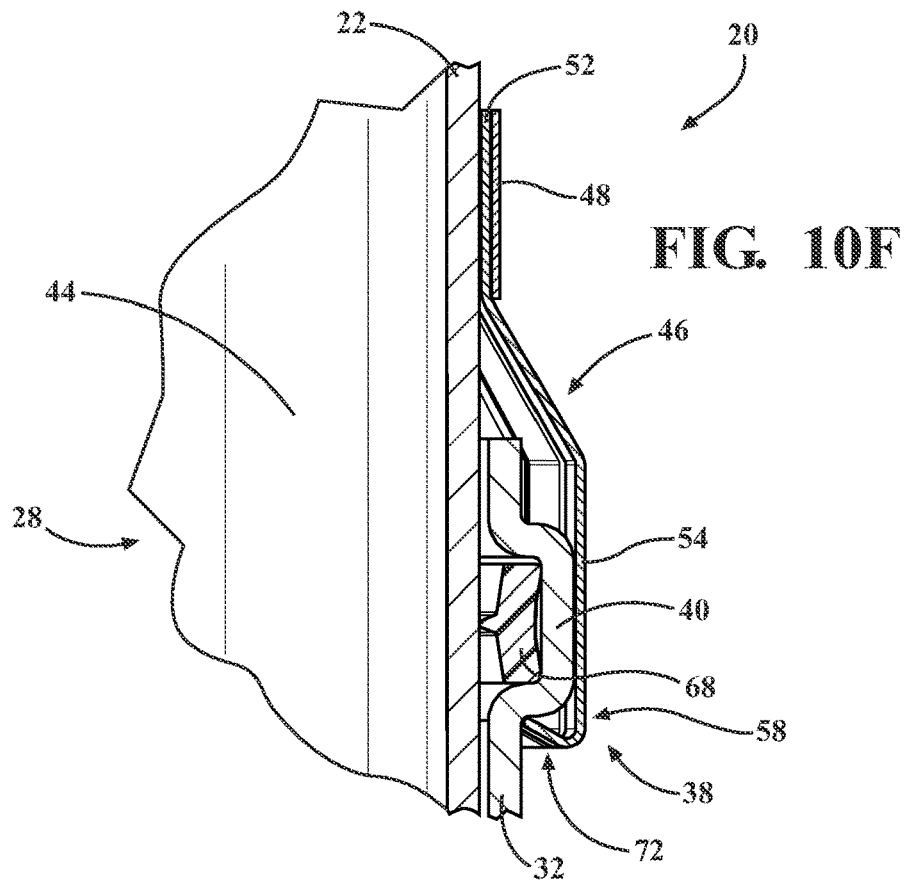
FIG. 10F is a cross-sectional view of the conduit locking system with the conduit locking band in the clamped position.
Figure 11A:
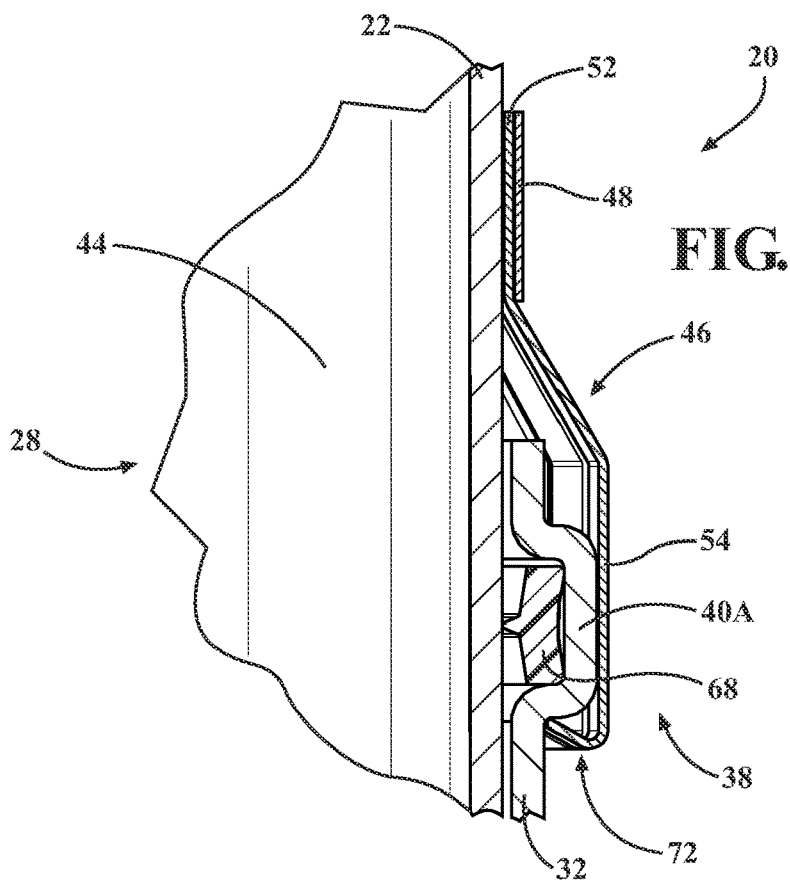
FIG. 11A is a cross-sectional view of the conduit locking system with a rectangular shaped outer surface of the engagement protrusion of the female portion of the second cylindrical conduit.
Figure 11B:
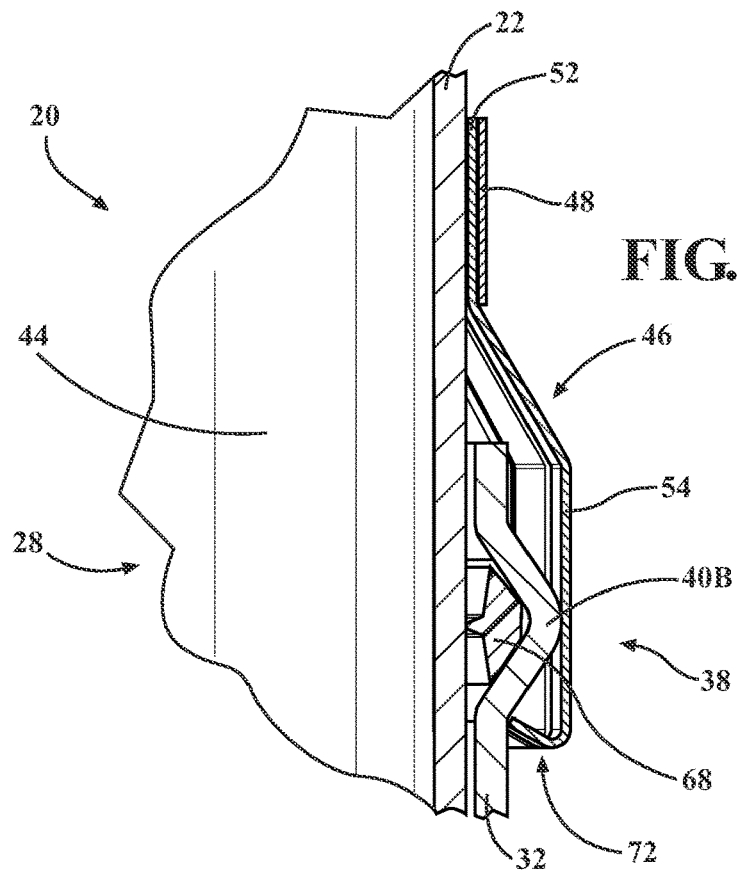
FIG. 11B is a cross-sectional view of the conduit locking system with a triangular shaped outer surface of the engagement protrusion of the female portion of the second cylindrical conduit.
Figure 11C:
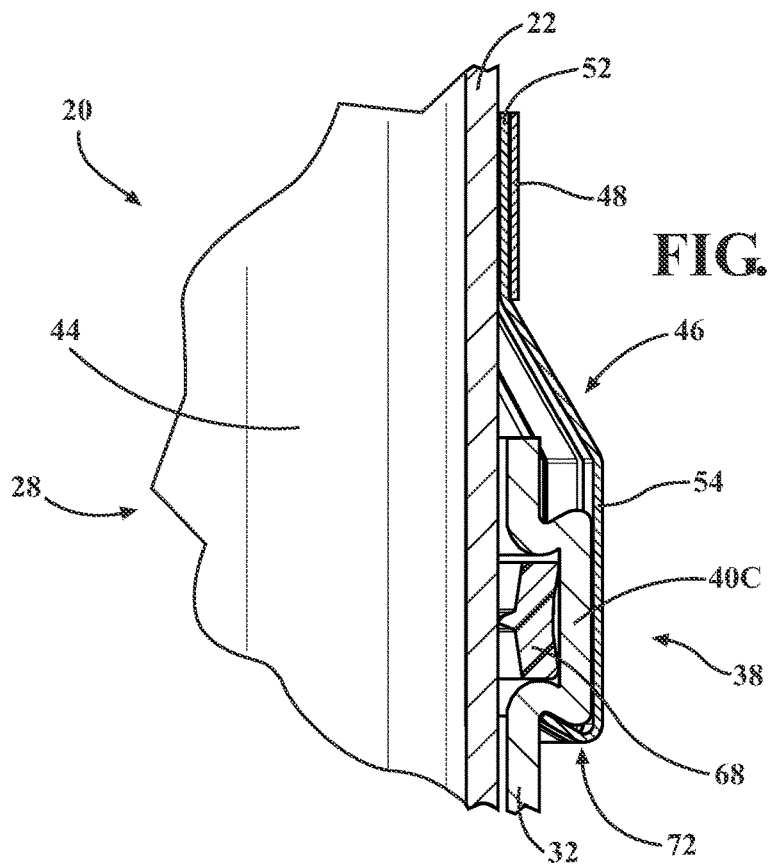
FIG. 11C is a cross-sectional view of the conduit locking system with a trapezoidal shaped outer surface of the engagement protrusion of the female portion of the second cylindrical conduit.
Figure 11D:
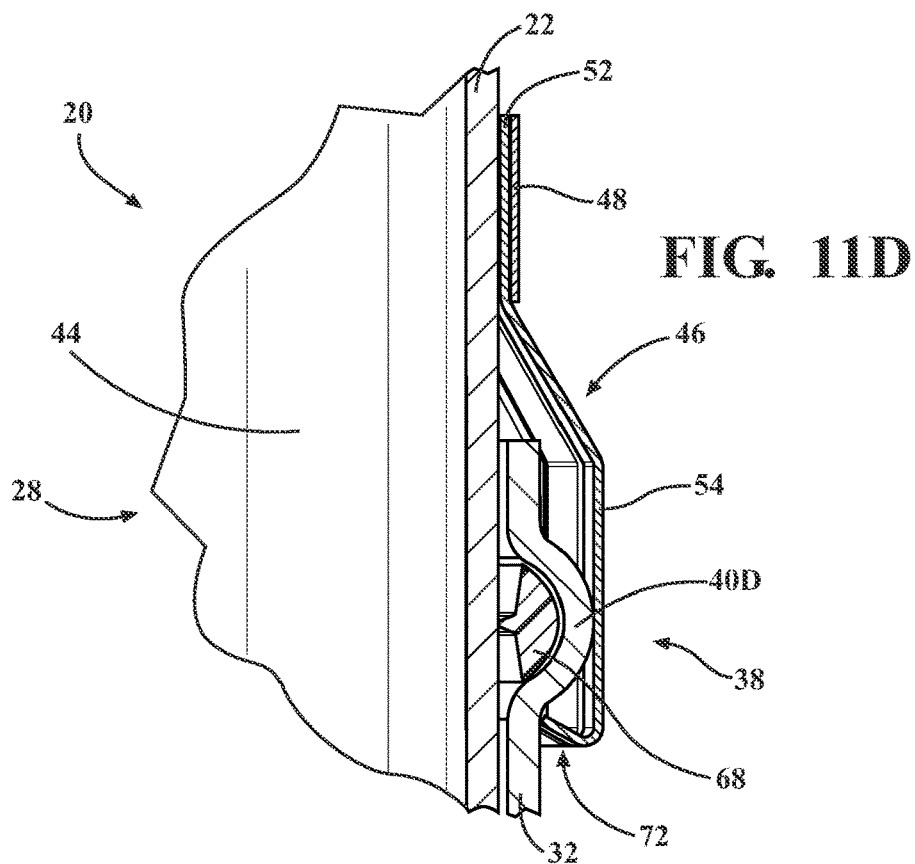
FIG. 11D is a cross-sectional view of the conduit locking system with an ovoidal shaped outer surface of the engagement protrusion of the female portion of the second cylindrical conduit.
Figure 11E:
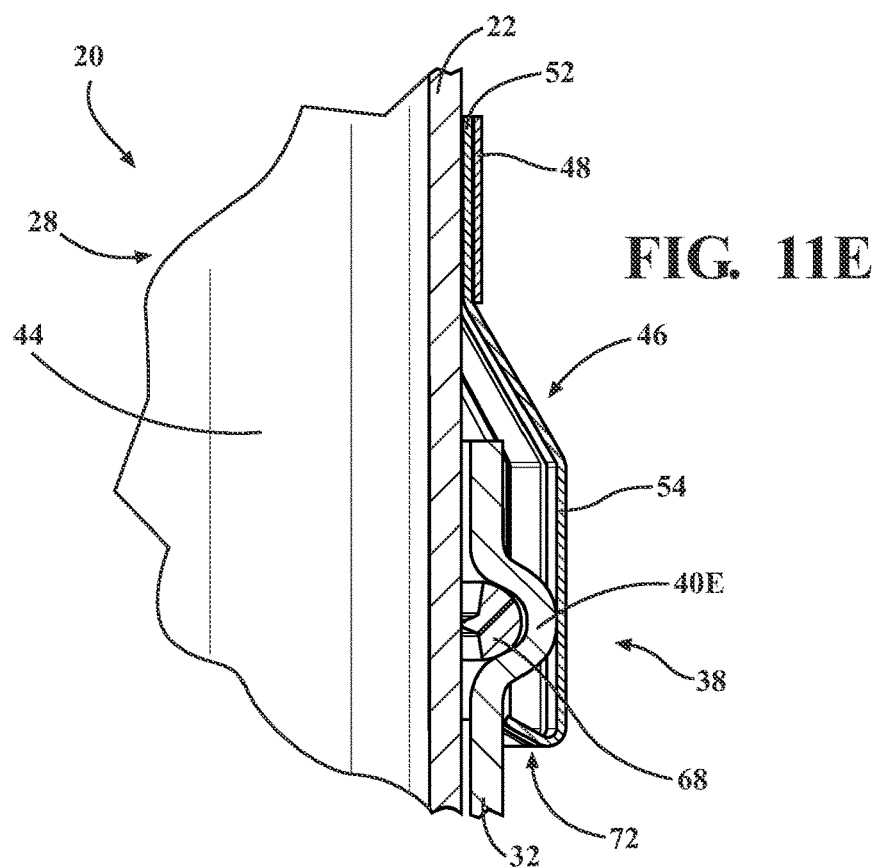
FIG. 11E is a cross-sectional view of the conduit locking system with a circular shaped outer surface of the engagement protrusion of the female portion of the second cylindrical conduit.

As shown in FIGS. 10D, 10E, and 10F, the method further includes the step of applying a force to move the conduit locking band 46 from an unclamped position 56 to a clamped position 58 thereby releasably locking the first cylindrical conduit 22 to the second cylindrical conduit 32.

The method additionally includes the step of applying a rotational force to move the conduit locking band 46 from an unclamped position 56 to a clamped position 58 thereby releasably locking the first cylindrical conduit 22 to the second cylindrical conduit 32.

The method further includes the step of applying a fluid to the seal 68 allowing the engagement of the male and female portions 28, 38 to seal fluidly. The seal 68 is partially disposed within the circumferential channel 66 and configured to form an air tight seal between the first and second conduit 22, 32. The seal 68 is configured to deflect against the outer surface 26 of the male portion 28 of the first cylindrical conduit 22 causing friction when disposing the male portion 28 into the female portion 38. The fluid reduces the friction, allowing the male portion 28 of the first cylindrical conduit 22 to engage and fully seal with the female portion 38 of the second cylindrical conduit 32.

The method may further comprise coupling a third cylindrical conduit to one of the first or the second cylindrical conduit. The method may comprise the step of providing the third cylindrical conduit, wherein the third cylindrical conduit comprises a female portion including an engagement protrusion extending radially outward and having an inner diameter. The inner diameter of the female portion being greater than the outer diameter of the male portion of the second cylindrical conduit and the engagement protrusion defining a recess in an outer surface of the female portion of the third cylindrical conduit. The method may further comprise the step of providing a second annular band comprising a tensioner and a plurality of fingers disposed radially thereabout. To couple the third cylindrical conduit to the second cylindrical conduit, the method may comprise the step of positioning at least a portion of each of the plurality of the fingers within the recess of the female portion of the third cylindrical conduit and adjacent the engagement protrusion such that each of the plurality of the fingers engage the engagement protrusion on the outer surface of the female portion of the third cylindrical conduit. The method may also comprise sliding a male portion of the second cylindrical conduit within the female portion of the third cylindrical conduit and through the second annular band, such that the plurality of fingers remain engaged with the engagement protrusion on the female portion to define a continuous fluid passageway, and manipulating the tensioner to apply a force to the annular band to move the second annular band from an unclamped position to a clamped position thereby releasably locking the second cylindrical conduit to the third cylindrical conduit.

Clauses directed to additional configurations:

I. A conduit locking system for appliance exhaust, said conduit locking system comprising:
  a first cylindrical conduit (22) having an inner surface and an outer surface, said first cylindrical conduit including a male portion (28) having an outer diameter;
  a second cylindrical conduit (32) having an inner surface and an outer surface, said second cylindrical conduit having a female portion (38) including an engagement protrusion radially disposed on said outer surface, said female portion having an inner diameter configured to engage said outer diameter of said male portion of said first cylindrical conduit to define a continuous fluid passageway therethrough;
  a conduit locking band (46) comprising:
  an annular band (48) having a tensioner (50) and configured to engage said male portion of said first cylindrical conduit;
  a locking arrangement (52) coupled to said annular band and comprising a plurality of fingers (54), said plurality of fingers disposed radially about said annular band and configured to engage said engagement protrusion of said female portion of said second cylindrical conduit;
  wherein said conduit locking band is configured to move from an unclamped position to a clamped position, wherein said conduit locking band has a clamped circumference when in said clamped position, and has an unclamped circumference when in said unclamped position, and wherein said unclamped circumference is greater than said clamped circumference.

II. The conduit locking system of clause I, wherein said engagement protrusion defines a circumferential channel in said inner surface of said female portion.

III. The conduit locking system of clause II, further comprising a seal engaging said outer surface of said male portion of said first cylindrical conduit, wherein said channel is configured to at least partially receive said seal for sealing said continuous fluid passageway.

IV. The conduit locking system of clause III, wherein said seal comprises an elastomer.

V. The conduit locking system as set forth in any one of the preceding clauses, wherein said engagement protrusion defines one of a rectangular, trapezoidal, triangular, ovular, and circular cross-sectional profile.

VI. The conduit locking system as set forth in any one of the preceding clauses, wherein said engagement protrusion has a height of from about 1 mm to about 5 mm.

VII. The conduit locking system as set forth in any one of the preceding clauses, wherein said outer surface of said engagement protrusion of said female portion of said second cylindrical conduit defines a protrusion radius, wherein said outer surface of said female portion of said second cylindrical conduit defines a conduit radius, and wherein said protrusion radius and said conduit radius have a ratio of from about 1:1.1 to about 1:1.25.

VIII. The conduit locking system as set forth in any one of the preceding clauses, wherein said annular band further defines slots, wherein said tensioner comprises a screw mechanism configured to cooperate with said slots, and wherein said screw mechanism is configured to tighten said annular band when said screw mechanism is turned to secure said conduit locking system in said clamped position.

IX. The conduit locking system as set forth in any one of the preceding clauses, wherein each of said fingers have a width of from about 4 mm to about 15 mm.

X. The conduit locking system as set forth in any one of the preceding clauses, wherein each of said fingers has a thickness of from about 0.2 mm to about 1.5 mm, such that each of said fingers is configured to be resiliently flexible in said unclamped position.

XI. The conduit locking system as set forth in any one of the preceding clauses, wherein each of said fingers have a hook-like portion configured to engage said outer surface of said engagement protrusion of said female portion of said second cylindrical conduit to couple said male and female portions and to secure said conduit locking band in said clamped position.

XII. The conduit locking system as set forth in any one of the preceding clauses, wherein said first and second cylindrical conduits comprise a polyolefin selected from the group consisting of polyethylene, polypropylene, polymethylpentene, polyethylene terephthalate, and combinations thereof.

XIII The conduit locking system as set forth in any one of the preceding clauses, wherein said conduit locking band comprises a metal selected from the group consisting of iron, galvanized steel, aluminum, stainless steel, and combinations thereof.

XIV. The conduit locking system as set forth in any one of the preceding clauses, wherein said annular band and said locking arrangement are integrally formed, and said plurality of fingers are disposed radially thereabout.

XV. The conduit locking system as set forth in any one of the preceding clauses, wherein said locking arrangement comprises a plurality of fingered regions and a plurality of non-fingered regions, and wherein said locking arrangement has a ratio of said fingered regions to said non-fingered regions of 4:1 along a circumference of said locking arrangement.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A conduit locking system for defining an exhaust pathway, said conduit locking system comprising:
  a first cylindrical conduit having a first end and an opposing second end, said first end including a male portion having an outer diameter and said second end including a female portion,
  wherein said female portion comprises an outer surface including an engagement protrusion radially disposed on said outer surface;
  wherein said female portion comprises an inner diameter sized to receive a second male portion of a second cylindrical conduit to couple said first cylindrical conduit to the second cylindrical conduit to define the exhaust pathway therethrough;

a conduit locking band comprising:
  an annular band having a tensioner and configured to engage said male portion of said first cylindrical conduit;
  a locking arrangement coupled to said annular band and comprising a plurality of fingers, said plurality of fingers disposed radially about said annular band and configured to engage an engagement protrusion of a female portion of the second cylindrical conduit when the second cylindrical conduit is coupled to said first cylindrical conduit;
  wherein said conduit locking band is configured to move from an unclamped position to a clamped position, wherein said conduit locking band has a clamped circumference when in said clamped position, and has an unclamped circumference when in said unclamped position, and wherein said unclamped circumference is greater than said clamped circumference.

2. The conduit locking system of claim 1, wherein said engagement protrusion defines a circumferential channel in an inner surface of said female portion.

3. The conduit locking system of claim 2, further comprising a seal engaging an outer surface of the male portion of the second cylindrical conduit, wherein said channel is configured to at least partially receive said seal for sealing said continuous fluid passageway.

4. The conduit locking system of claim 3, wherein said seal comprises an elastomer.

5. The conduit locking system of claim 1, wherein said engagement protrusion comprises one of a rectangular, trapezoidal, triangular, ovular, and circular cross-sectional profile.

6. The conduit locking system of claim 1, wherein said engagement protrusion has a height of from about 1 mm to about 5 mm.

7. The conduit locking system of claim 1, wherein said outer surface of said engagement protrusion of said female portion of said first cylindrical conduit defines a protrusion radius, wherein said outer surface of said female portion of said first cylindrical conduit defines a conduit radius, and wherein said protrusion radius and said conduit radius have a ratio of from about 1:1.1 to about 1:1.25.

8. The conduit locking system of claim 1, wherein said annular band comprises a plurality of slots and a tensioner, said tensioner comprising a screw mechanism is configured to engage said slots to manipulate a circumference of said annular band when said screw mechanism is turned to move said annular band between said unclamped position and said clamped position.

9. The conduit locking system of claim 1, wherein each of said fingers have a width of from about 4 mm to about 15 mm.

10. The conduit locking system of claim 1, wherein each of said fingers has a thickness of from about 0.2 mm to about 1.5 mm, such that each of said fingers is configured to be resiliently flexible in said unclamped position.

11. The conduit locking system of claim 1, wherein said engagement protrusion defines a recess in said outer surface of said female portion of said second conduit; and
  wherein each of said fingers comprise a hook-like portion configured to be at least partially disposed within said recess and to engage said outer surface of said engagement protrusion of said female portion of said first cylindrical conduit to couple the second male portion of the second cylindrical conduit to said female portion of said first cylindrical conduit when said conduit locking band is in said clamped position.

12. The conduit locking system of claim 1, wherein said first and second cylindrical conduits comprise a polyolefin selected from the group consisting of polyethylene, polypropylene, polymethylpentene, polyethylene terephthalate, and combinations thereof.

13. The conduit locking system of claim 1, wherein said conduit locking band comprises a metal selected from the group consisting of iron, galvanized steel, aluminum, stainless steel, and combinations thereof.

14. The conduit locking system of claim 1, wherein said annular band and said locking arrangement are integrally formed, and said plurality of fingers are disposed radially thereabout.

15. The conduit locking system of claim 1, wherein said locking arrangement comprises a plurality of fingered regions and a plurality of non-fingered regions, and wherein said locking arrangement has a ratio of said fingered regions to said non-fingered regions of 4:1 along a circumference of said locking arrangement.

16. A method of securing a first cylindrical conduit to a second cylindrical conduit comprising the steps of:
  providing a first cylindrical conduit comprising a male portion having an outer diameter;
  providing a second cylindrical conduit comprising a female portion including an engagement protrusion extending radially outward and having an inner diameter, the inner diameter of the female portion being greater than the outer diameter of the male portion of the first cylindrical conduit and the engagement protrusion defining a recess in an outer surface of the female portion of the second cylindrical conduit;
  providing an annular locking band comprising a tensioner and a plurality of fingers disposed radially thereabout;
  positioning at least a portion of each of the plurality of the fingers within the recess and adjacent the engagement protrusion such that each of the plurality of the fingers engage the engagement protrusion on the outer surface of the female portion of the second cylindrical conduit;
  sliding the male portion of the first cylindrical conduit within the female portion of the second cylindrical conduit and through the annular band, such that the plurality of fingers remain engaged with the engagement protrusion on the female portion to define a continuous fluid passageway; and
  manipulating the tensioner to apply a force to the annular band to move the annular band from an unclamped position to a clamped position thereby releasably locking the first cylindrical conduit to the second cylindrical conduit.

17. The method set forth in claim 16, further comprising the step of applying a rotational force to the tensioner to move the annular locking band from an unclamped position to a clamped position thereby releasably locking the first cylindrical conduit to the second cylindrical conduit.

18. The method set forth in claim 17, further comprising:
  providing a seal at least partially housed in a circumferential channel in an interior surface of the female portion of the second cylindrical conduit defined by the engagement protrusion; and
  applying a fluid to the seal allowing the engagement of the male and female portions to seal fluidly.

19. The method set forth in claim 16, further comprising:
  providing a third cylindrical conduit comprising a female portion including an engagement protrusion extending radially outward and having an inner diameter, the inner diameter of the female portion being greater than the outer diameter of a male portion of the second cylindrical conduit and the engagement protrusion defining a recess in an outer surface of the female portion of the third cylindrical conduit;

providing a second annular band comprising a tensioner and a plurality of fingers disposed radially thereabout;

positioning at least a portion of each of the plurality of the fingers within the recess of the female portion of the third cylindrical conduit and adjacent the engagement protrusion such that each of the plurality of the fingers engage the engagement protrusion on the outer surface of the female portion of the third cylindrical conduit;

sliding a male portion of the second cylindrical conduit within the female portion of the third cylindrical conduit and through the second annular band, such that the plurality of fingers remain engaged with the engagement protrusion on the female portion to define a continuous fluid passageway; and manipulating the tensioner to apply a force to the second annular band to move the second annular band from an unclamped position to a clamped position thereby releasably locking the second cylindrical conduit to the third cylindrical conduit.

\* \* \* \* \*